United States Patent
Anderson et al.

(10) Patent No.: US 11,047,053 B1
(45) Date of Patent: Jun. 29, 2021

(54) CONTROL OF CHANGE OF PHASE THROUGH PHYSICAL SURFACE SHAPING

(71) Applicant: NuTech Ventures, Inc., Lincoln, NE (US)

(72) Inventors: Troy Anderson, Omaha, NE (US); Sidy Ndao, Lincoln, NE (US); Craig Zuhlke, Lincoln, NE (US); Dennis Alexander, Lincoln, NE (US); George Gogos, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 431 days.

(21) Appl. No.: 14/595,452

(22) Filed: Jan. 13, 2015

Related U.S. Application Data (60) Provisional application No. 61/926,431, filed on Jan. 13, 2014.

(51) Int. Cl.
　　*C25B 11/02*　　(2021.01)
　　*C25B 1/04*　　(2021.01)
　　*B01J 7/02*　　(2006.01)

(52) U.S. Cl.
　　CPC .............. *C25B 11/02* (2013.01); *B01J 7/02* (2013.01); *C25B 1/04* (2013.01)

(58) Field of Classification Search
　　CPC .............. C25B 1/04; C25B 11/02; B01J 7/02
　　See application file for complete search history.

(56) References Cited

U.S. PATENT DOCUMENTS

2012/0328905 A1* 12/2012 Guo ..................... C21D 8/0294
　　　　　　　　　　　　　　　　　　428/687

OTHER PUBLICATIONS

Kruse et al. "Enhanced Pool-Boiling Heat Transfer and Critical Heat Flux Using Femtosecond Laser Surface Processing," 14th IEEE ITHERM Conference, pp. 444-451; May 1, 2014 (Year: 2014).*

Koch, K., Bhushan, B., Jung, Y., Barthlott, W., "Fabrication of artificial Lotus leaves and significance of hierarchical structure for superhydrophobicity and low adhesion", Soft Matter 2009, 5 (7), 1386-1393. (Abstract).

Stratakis, E., Ranella, A., Fotakis, C., "Biomimetic micro/nanostructured functional surfaces for microfluidic and tissue engineering applications", Biomicrofluidics 2011, 5, 013411.

(Continued)

*Primary Examiner* — Nicholas A Smith
(74) *Attorney, Agent, or Firm* — Leydig, Voit & Mayer, Ltd.; Gerald T. Gray (57) ABSTRACT

A system embodiment includes, but is not limited to, a solid structure configure to contact each of a material in a liquid phase and a material in a vapor phase, the solid structure including a plurality of microstructures protruding at angles relative to a horizontal plane; and a layer of nanoparticles positioned on the plurality of microstructures, the layer of nanoparticles having a composition that is at least one of a same material as the plurality of microstructures and an oxide of the same material as the plurality of microstructures, the plurality of microstructures defining one or more valleys, each of the one or more valleys positioned between the layer of nanoparticles of adjacent microstructures of the plurality of microstructures, the one or more valleys configured to govern at least one of a size and a shape of a bubble of the material in the vapor phase.

19 Claims, 8 Drawing Sheets

(56) References Cited

OTHER PUBLICATIONS

Feng, L., Zhang, Y., Xi, J., Zhu, Y., Wang, N., Xia, F., Jiang, L., "Petal effect: a superhydrophobic state with high adhesive force", Langmuir 2008, 24, 4114-4119.

Tull, B., Carey, J., Mazur, E., McDonald, J., Yalisove, S., "Silicon surface morphologies after femtosecond laser irradiation", MRS Bull. 2006, 31, 626-633.

Wu, B., Zhou, M., Li, J., Ye, X., Li, G., Cai, L., "Superhydrophobic surfaces fabricated by microstructuring of stainless steel using a femtosecond laser", Appl. Surf Sci. 2009, 256, 61-66. (Abstract).

Nayak, B., Gupta, M., Kolasinski, K., "Spontaneous formation of nanospiked microstructures in germanium by femtosecond laser irradiation", Nanotechnology 2007, 18, 195302.

Nayak, B., Gupta, M., "Ultrafast laser-induced self-organized conical micro/nano surface structures and their origin", Optics and Lasers in Engineering 2010, 48, 966-973.

Her, T., Finlay, R., Wu, C., Mazur, E., Femtosecond laser-induced formation of spikes on silicon. Appl. Phys. A: Mater. Sci. Process. 2000, 70, 383-385.

Yong Hwang, T., Guo, C., "Polarization and angular effects of femtosecond laser-induced conical microstructures on Ni", J. Appl. Phys. 2012, 111, 083518-083518.

Zuhlke, C., Anderson, T., Alexander, D., "Formation of multiscale surface structures on nickel via above surface growth and below surface growth mechanisms using femtosecond laser pulses", Opt. Express 2013, 21, 8460-8473.

Tsibidis, G., Barberoglou, M., Loukakos, P., Stratakis, E., Fotakis, C., "Dynamics of ripple formation on silicon surfaces by ultrashort laser pulses in subablation conditions", Phys. Rev. B 2012, 86, 115316.

Sanchez, F., Morenza, J., Trtik, V., "Characterization of the progressive growth of columns by excimer laser irradiation of silicon", Appl. Phys. Lett. 1999, 75, 3303-3305.

Crouch, C., Carey, J., Warrender, J., Aziz, M., Mazur, E., Genin, F., "Comparison of structure and properties of femtosecond and nanosecond laser-structured silicon", Appl. Phys. Lett. 2004, 84, 1850-1852.

Dolgaev, S., Lavrishev, S., Lyalin, A., Simakin, A., Voronov, V., Shafeev, G., "Formation of conical microstructures upon laser evaporation of solids", Appl. Phys. A: Mater. Sci. Process. 2001, 73, 177-181.

Pedraza, A. Fowlkes, J., Lowndes, D., "Self-organized silicon micro column arrays generated by pulsed laser irradiation", Phys. A: Mater. Sci. Process. 1999, 69, 731-734.

Wenzel, R., "Surface Roughness and Contact Angle" J. Phys. Chem. 1949, 53, 1466-1467.

Vorobyev, A., Guo, C. "Metal pumps liquid uphill", Appl. Phys. Lett. 2009, 94, 224102-224102.

Vorobyev, A., Guo, C. "Laser turns silicon superwicking", Opt. Express 2010, 18, 6455-6460.

Tran, T., Staat, H. Prosperetti, A., Sun, C., Lohse, D., "Drop impact on superheated surfaces", Phys. Rev. Lett. 2012, 108, 036101.

Avedisian, C., Koplik, J., "Leidenfrost boiling of methanol droplets on hot porous/ceramic surfaces", Int. J. Heat Mass Transfer 1987, 30, 379-393. (Abstract).

Quere, D. "Leidenfrost Dynamics", Annu. Rev. Fluid Mech. 2013, 45, 197-215.

Kietzig, A., Hatzikiriakos, S., Englezos, P., "Patterned superhydrophobic metallic surfaces", Langmuir 2009, 25,4821-4827.

Agapov, R.L., Boreyko, J.B., Briggs, D.P. et al. (2014), "Length scale of Leidenfrost ratchet switches droplet directionality. Nanoscale" doi: 10.1039/c4nr02362e.

Bradfield, W. (1966), "Liquid-solid contact in stable film boiling", Ind Eng Chem Fundam 5:200-204.

Brochard, F. (1989), "Motions of droplets on solid surfaces induced by chemical or thermal gradients", Langmuir 5:432-438.

Brzoska, J., Brochard-Wyart, F., Rondelez, F. (1993), "Motions of droplets on hydrophobic model surfaces induced by thermal gradients", Langmuir 9:2220-2224.

Chaudhury, M., Whitesides, G. (1992), "How to make water run uphill", Science (80-) 256:1539-1541. (Abstract).

Darhuber, A.A., Valentino, J.P., Davis, J.M. et al. (2003), "Microfluidic actuation by modulation of surface stresses", Appl Phys Lett 82:657. doi: 10.1063/1.1537512.

Dos Santos, F., Ondarcuhu, T. (1995), "Free-running droplets", Phys Rev Lett 75:2972. (Abstract).

Dupeux, G., Le Merrer, M., Lagubeaum G. et al. (2011), "Viscous mechanism for Leidenfrost propulsion on a ratchet", EPL Europhysics Lett 96:58001. doi: 10.1209/0295-5075/96/58001.

Grounds, A., Still, R., Takashina, K. (2012), "Enhanced droplet control by transition boiling", Sci Rep 2:720. doi: 10.1038/srep00720.

Hashmi, A., Xu, Y., Coder, B. et al. (2012), "Leidenfrost levitation: beyond droplets", Sci Rep 2:797. doi: 10.1038/srep00797.

Hwang, T.Y., Guo, C. (2011), "Polarization and angular effects of femtosecond laser-induced nanostructure-covered large scale waves on metals", J Appl Phys. doi: 10.1063/1.3646330.

John, K., Bär, M., Thiele, U. (2005), "Self-propelled running droplets on solid substrates driven by chemical reactions", Eur Phys J E Soft Matter 18:183-99. doi: 10.1140/epje/i2005-10039-1.

Kim, H., Truong, B., Buongiorno, J., Hu, L-W. (2011), "On the effect of surface roughness height, wettability, and nanoporosity on Leidenfrost phenomena", Appl Phys Lett 98:083121. doi: 10.1063/1.3560060.

Kruse, C. Anderson, T., Wilson, C. et al. (2013), "Extraordinary shifts of the Leidenfrost temperature from multiscale micro/nanostructured surfaces", Langmuir 29:9798-806. doi: 10.1021/la401936w.

Lagubeau, G/, Le Merrer, M., Clanet, C, Quéré D (2011), "Leidenfrost on a ratchet", Nat Phys 7:395-398. doi: 10.1038/nphys1925.

Linke, H., Alemán, B., Melling, L. et al. (2006), "Self-Propelled Leidenfrost Droplets", Phys Rev Lett 96:2-5. doi: 10.1103/PhysRevLett.96.154502.

Marin, A.G., Cerro, D.A. del (2012), "Capillary droplets on Leidenfrost micro-ratchets", Phys Fluids 24:122001.

Nayak, B.K., Gupta, M.C., Kolasinski, K.W. (2007), "Formation of nano-textured conical microstructures in titanium metal surface by femtosecond laser irradiation", Appl Phys A 90:399-402. doi: 10.1007/s00339-007-4349-2.

Ok, J.T., Lopez-Oña, E., Nikitopoulos, D.E., et al. (2010), "Propulsion of droplets on micro- and sub-micron ratchet surfaces in the Leidenfrost temperature regime", Microfluid Nanofluidics 10:1045-1054. doi: 10.1007/s10404-010-0733-x.

Piroird, K., Clanet, C., Quéré, D. (2012), "Magnetic control of Leidenfrost drops", Phys Rev E 85:10-13. doi: 10.1103/PhysRevE.85.056311.

Tsibidis, G.D., Stratakis, E., Loukakos, P.A., Fotakis, C. (2013), "Controlled ultrashort-pulse laser-induced ripple formation on semiconductors", Appl Phys A 114:57-68.

Vorobyev, A.Y., Guo C. (2013), "Direct femtosecond laser surface nano/microstructuring and its applications", Laser Photon Rev 7:385-407. doi: 10.1002/lpor.201200017.

Zuhlke, C.A., Anderson T.P., Alexander, D.R. (2013) "Comparison of the structural and chemical composition of two unique micro/nanostructures produced by femtosecond laser interactions on nickel", Appl Phys Lett 103:121603. doi: 10.1063/1.4821452.

Zuhlke, "Control and Understanding of the Formation of Micro/Nanostructured Metal Surfaces Using Femtosecond Laser Pulses," UMI No. 3546643.

Zuhlke et al., "Fundamentals of layered nanoparticle covered pyramidal structures formed on nickel during femtosecond laser surface interactions," Applied Surface Science 283 (2013), 648-653.

Zuhlke, C.A. et al. (2010), "Self assembled nanoparticle aggregates from line focused femtosecond laser ablation", Optics Express, vol. 18, No. 5, 4329-4339.

Zuhlke, C.A. et al. (2014), "A Fundamental Understanding of the Dependence of the Laser-Induced Breakdown Spectroscopy (LIBS) Signal Strength on the Complex Focusing Dynamics of Femtosecond Laser Pulses on Either Side of the Focus", Applied Spectroscopy, vol. 68. No. 9, 1021-1029.

(56) References Cited

OTHER PUBLICATIONS

Zhang, S., Gogos, G., "Film evaporation of a spherical droplet over a hot surface: fluid mechanics and heat! mass transfer analysis", J. Fluid Mech. 1991, 222, 543-563. (Abstract).

Biance, A, Clanet, C., Quere, D., "Leidenfrost drops", Phys. Fluids 2003, 15, 1632-1637.

Burton, J., Sharpe, A., van der Veen, R., Franco, A., Nagel, S. "Geometry of the vapor layer under a Leidenfrost drop", Phys. Rev. Lett. 2012, 109, 074301.

Vakarelski, I., Patankar, N., Marston, J., Chan, D., Thoroddsen, S., "Stabilization of Leidenfrost vapour layer by textured superhydrophobic surfaces", Nature 2012, 489 (7415), 274-277.

Vakarelski, I., Marston, J., Chan, D., Thoroddsen, S., "Drag reduction by Leidenfrost vapor layers", Phys. Rev. Lett. 2011, 106, 214501.

Carey, V. P., "Liquid-vapor phase-change phenomena", Taylor and Francis, 1992. (Abstract).

Bernardin, J., Mudawar, I., "The Leidenfrost point: experimental study and assessment of existing models", Transactions-American Society of Mechanical Engineers Journal of Heat Transfer 1999, 121, 894-903.

Tamura, Z., Tanasawa, Y., "Evaporation and combustion of a drop contacting with a hot surface", Symposium (International) on Combustion 1958, 7, 509-522.

Patel, B. M., Bell, K J., "The Leidenfrost phenomenon for extended liquid masses", Doctoral dissertation, Oklahoma State University, 1965. (Abstract).

Emmerson, G., "The effect of pressure and surface material on the leidenfrost point of discrete drops of water", Int. J. Heat Mass Transfer 1975, 18 (3), 381-386. (Abstract).

Xiong, T., Yuen, M., "Evaporation of a liquid droplet on a hot plate", Int. J. Heat Mass Transfer 1991, 34 (7), 1881-1894. (Abstract).

Hughes, F., "The evaporation of drops from super-heated nano-engineered surfaces", Doctoral dissertation, Massachusetts Institute of Technology, 2009.

Takata, Y., Hidaka, S., Yamashita, A., Yamamoto, H., "Evaporation of water drop on a plasma-irradiated hydrophilic surface", International Journal of Heat and Fluid Flow 2004, 25 (2), 320-328.

Munoz, R., Beving, D. Yan, Y., "Hydrophilic zeolite coatings for improved heat transfer", Ind. Eng. Chem. Res. 2005, 44, 4310-4315.

Huang, C., Carey, V., "The effects of dissolved salt on the Leidenfrost transition", Int. J. Heat Mass Transfer 2007, 50 (1), 269-282.

Arnaldo del Cerro, D., Marin, A., Romer, G., Pathiraj, B., Lohse, D., Huis in 't Veld, "Leidenfrost point reduction in micro-patterned metallic surfaces", Langmuir 2012, 28, 15106-15110.

Bizi-Bandoki, P., Benayoun, S., Valette, S., Beaugiraud, B., Audouard, E., "Modifications of roughness and wettability properties of metals induced by femtosecond laser treatment", Appl. Surf Sci. 2011, 257 (12), 5213-5218.

Wang, Z., Zheng, H., Xia, H., "Femtosecond laser-induced modification of surface wettability of PMMA for fluid separation in micro channels", Microfluid. Nanofluid. 2011, 10 (1), 225-229.

Wu, J., Xia, J., Lei, W., Wang, B., "A one-step method to fabricate lotus leaves-like ZnO film", Mater. Lett. 2011, 65 (3), 477-479.

Baldacchini, T., Carey, J., Zhou, M., Mazur, E., "Super-hydrophobic surfaces prepared by microstructuring of silicon using a femtosecond laser", Langmuir 2006, 22 (11), 4917-4919.

\* cited by examiner

CONTROL OF CHANGE OF PHASE THROUGH PHYSICAL SURFACE SHAPING

CROSS-REFERENCE TO RELATED APPLICATIONS

The present application claims the benefit under 35 U.S.C. § 119(e) of U.S. Provisional Application Ser. No. 61/926,431, filed Jan. 13, 2014, and titled "Control Of Phase Transitions Through Physical Surface Shaping," which is hereby incorporated by reference in its entirety.

FEDERALLY SPONSORED RESEARCH OR DEVELOPMENT

This invention was made with Government support under Grant No. FA9451-12-D-0195 awarded by the Air Force Research Laboratory. The Government has certain rights in this invention.

BACKGROUND

A phase change of a material, such as a change from a liquid phase to a vapor phase, a change from a vapor phase to a liquid phase, and so forth, is generally facilitated by changes in the pressure or the temperature of the material and/or surrounding environment. Phase changes can involve various interfaces between two or more phases of the material, between one or more phases of the material and an environmental surface or condition, and so forth, which can influence various properties of the material including rates of phase change and temperatures at which phase change occurs. Such interfaces can involve a liquid/vapor/solid interface which can provide heterogeneous nucleation sites for the formation of vapor bubbles in the liquid proximate the solid surface.

SUMMARY

A system for the control of change of phase of a material includes, but is not limited to, a solid structure configured to contact each of a material in a liquid phase and a material in a vapor phase, the solid structure including a plurality of microstructures protruding at one or more angles relative to a horizontal plane; and at least one layer of nanoparticles positioned on the plurality of microstructures, the at least one layer of nanoparticles having a composition that is at least one of a same material as the plurality of microstructures and an oxide of the same material as the plurality of microstructures, the plurality of microstructures defining one or more valleys, each of the one or more valleys positioned between the at least one layer of nanoparticles of adjacent microstructures of the plurality of microstructures, the one or more valleys configured to govern at least one of a size and a shape of a bubble of the material in the vapor phase. In addition to the nanoparticle layer, a thin atomic layer of material deposited by Atomic Layer Deposition may be added.

A method for the control of change of phase of a material includes, but is not limited to, introducing a solid structure to a material in a liquid phase, the solid structure including: a plurality of microstructures protruding at one or more angles relative to a horizontal plane; and at least one layer of nanoparticles positioned on the plurality of microstructures, the at least one layer of nanoparticles having a composition that is at least the same as the starting material as the plurality of microstructures or an oxide of the same material as the plurality of microstructures, the plurality of microstructures defining one or more valleys, each of the one or more valleys positioned between the at least one layer of nanoparticles of adjacent microstructures of the plurality of microstructures; and forming at least one vapor bubble in the material in the liquid phase at one or more valleys of the solid structure, the one or more valleys governing at least one of a size and a shape of the bubble of the material in the vapor phase.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. In the figures, the use of the same reference numbers in different instances in the description and the figures may indicate similar or identical items.

DETAILED DESCRIPTION

Overview

Phase changes of a material generally involve transitions or thermodynamic transformations between various phases or states of matter, such as solid states, liquid states, vapor states, and plasma states. Many technical applications utilize a multi-phase interface between one or more materials, such as during heating operations, chemical species generation, nucleate boiling, condensation applications, microchannel heat transfer, and so forth. Such interfaces can include liquid/vapor/solid interfaces comprising one or more materials in the vapor and/or liquid phase and a solid surface. In many instances, phase changes (or transitions) are characterized by the development of a vapor bubble at a nucleation site, such as at a site on the solid surface.

A vapor bubble forming at a nucleation site can grow in size or volume until one or more of buoyancy of the bubble, flow of the liquid in which the bubble resides, and turbulence of the environment in which the bubble resides overcomes the adhesion forces between the bubble and the solid surface (e.g., the surface at and proximate to the nucleation site), at which point the bubble generally releases from the solid surface and into the liquid. Control over the formation of the bubbles at nucleation sites can be beneficial to the technical applications which utilize a multi-phase interface, particularly a liquid/vapor/solid interface.

Accordingly, the present disclosure is generally directed to control of change of phase of a material at a liquid/vapor/solid interface through physical surface shaping of the solid phase material. The role of the physical surface shaping is to control one or more of the following characteristics during the change of phase: the size of vapor bubbles, the shape of vapor bubbles, the orientation of vapor bubbles, the directionality of release of the vapor bubbles from the solid surface, the release rate of the vapor bubbles from the solid surface, and the spacing between bubbles (such as during generation on the solid surface). These characteristics can be controlled via physical surface shaping of the solid surface and can include one or more of a separation of microscale surface features (e.g., to physically limit bubble size during nucleation), definition of a peak to valley height of microscale surface features (e.g., to control isolation of nucleation sites), and definition of the angle of surface features protruding from the surface relative to the surface (e.g., to control the directional release of bubbles, to impact turbulence, and so forth).

In the following discussion, example structures for the control of change of phase and implementations of techniques for providing such structures are presented.

Example Structures

Figure 1A:
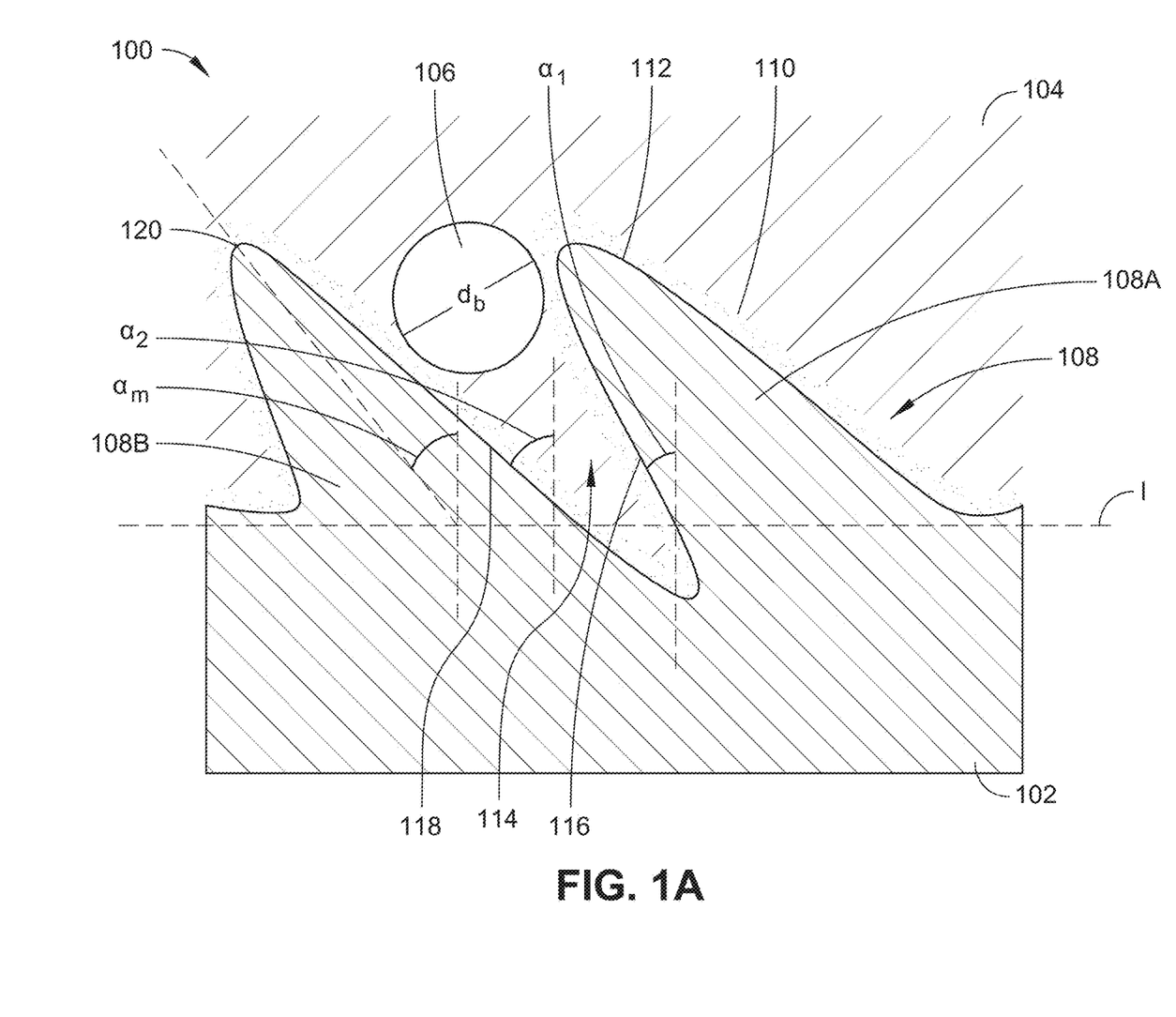
FIG. 1A is a schematic cross-sectional diagram of a shaped physical surface with a liquid/vapor/solid interface in accordance with an example implementation of the present disclosure.
Figure 1B:
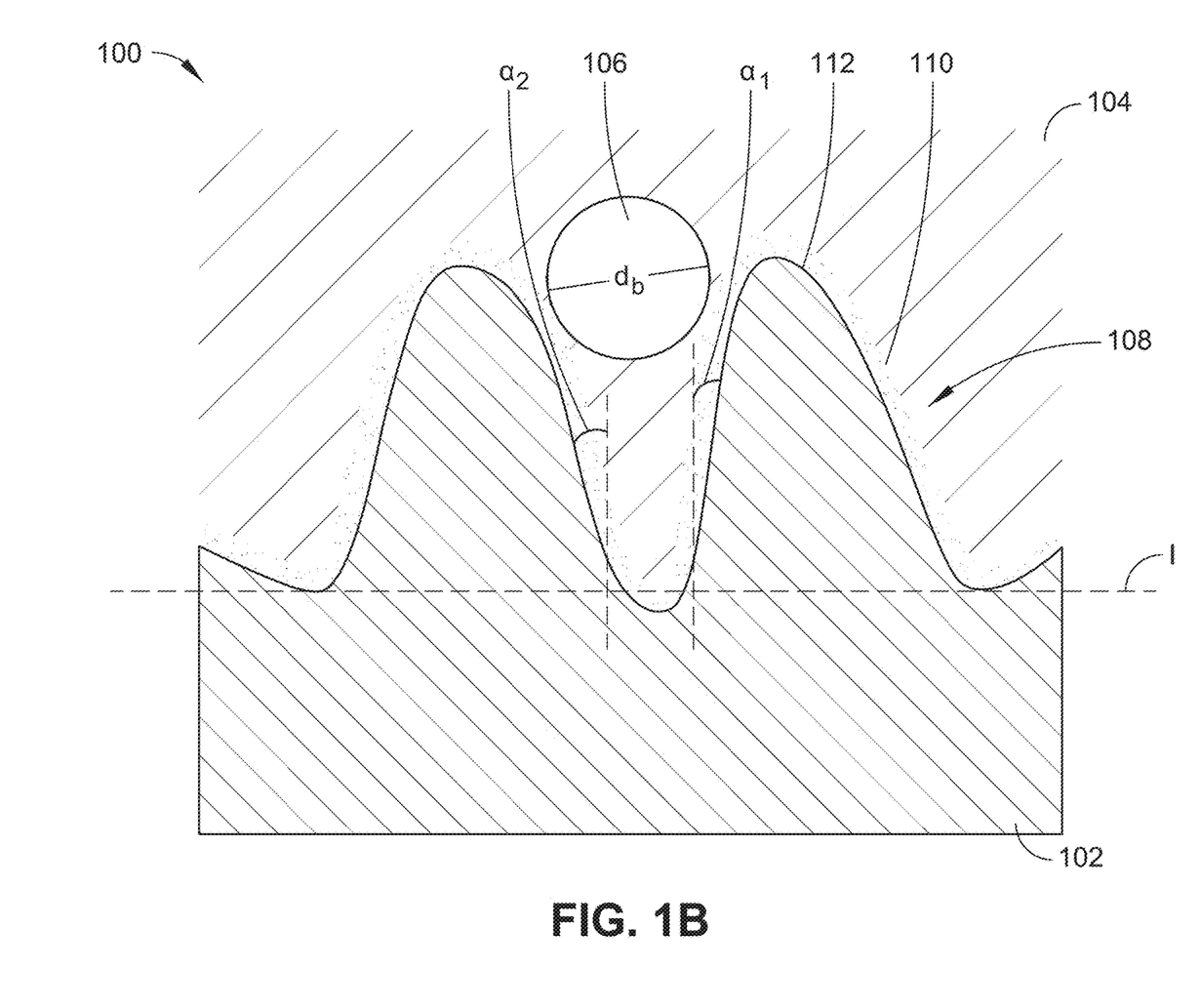
FIG. 1B is a schematic cross-sectional diagram of a shaped physical surface with a liquid/vapor/solid interface in accordance with an example implementation of the present disclosure.

Referring generally to FIGS. 1A and 1B, systems 100 for controlling the change of phase of a material at a liquid/vapor/solid interface is shown. The systems 100 generally includes a solid structure 102 configured to be in contact with each of a liquid phase 104 and a vapor phase 106 (shown as a vapor bubble). The solid structure 102 includes surface morphology configured to physically control the phase transition of a material from the liquid phase 104 to the vapor phase 106. As shown, the solid structure 102 defines one or more microstructures 108 (e.g., microstructures 108A and 108B) that protrude at an angle relative to a horizontal plane (labeled I). The microstructures 108 include a layer of nanoparticles 110 positioned on (e.g., formed on) a surface 112 of the microstructures 108. In implementations, the solid structure 102 is physically patterned to produce the microstructures 108 and the nanoparticles 110 positioned on the surface 112, such as through techniques including, but not limited to femtosecond laser surface processing (FLSP), which can develop the layer of nanoparticles 110 on the surface 112 through a combination of growth mechanisms including, but not limited to, preferential ablation, capillary flow of laser-induced melt layers, and redeposition of ablated surface features. The microstructures 108 can also include a layer (e.g., an atomic layer) of material deposited by an atomic layer deposition technique. In implementations, the atomic layer material is a low surface energy material to increase contact between the nanoparticles 110. In implementations, control over FLSP conditions such as laser fluence, incident pulse count, polarization, and incident angle, the size and density of both micrometer and nanometer-scale surface features can be tailored to thereby produce a multiscale metallic surface, which can affect heat transfer associated with, inter alia, change of phase of materials (see, e.g., Kruse et al., "Extraordinary Shifts of the Leidenfrost Temperature from Multiscale Micro/Nanostructured Surfaces," *Langmuir*, 29, 9798-9806 (2013); Zuhlke, "Control and Understanding of the Formation of Micro/Nanostructured Metal Surfaces Using Femtosecond Laser Pulses," UMI Number: 3546643; Zuhlke et al., "Comparison of the structural and chemical composition of two unique micro/nanostructures produced by femtosecond laser interactions on nickel," Appl. Phys. Lett. 103, 121603 (2013); Zuhlke et al., "Fundamentals of layered nanoparticle covered pyramidal structures formed on nickel during femtosecond laser surface interactions," Applied Surface Science 283 (2013), 648-653, which are incorporated herein by reference).

In implementations, the solid structure 102 and the microstructures 108 formed thereby are comprised of materials including, but not limited to, nickel, nickel alloy, gold, gold alloy, stainless steel alloy (e.g., 304 SS), titanium, titanium alloy, aluminum, aluminum alloy, copper, copper alloy, zirconium alloy (e.g., Zircaloy), silicon carbide, Inconel alloy (e.g., Inconel 740h), silicon, silicon alloy, germanium, germanium alloy, and mixtures thereof. In implementations, the nanoparticles 110 are comprised of the same materials as the microstructures 108, and can additionally or alternatively include oxides thereof. In general, the composition of the liquid phase 104 and the vapor phase 106 depend on the application to which the system 100 is employed and can include, but are not limited to, water, hydrofluoroether (HFE), and so forth. For instance, the liquid phase 104 and the vapor phase 106 can be the same material, such as a material transitioning from the liquid phase 104 to the vapor phase 106. In other instances, the liquid phase 104 differs from the vapor phase 106, such as where the liquid phase undergoes a chemical reaction, such as electrolysis of liquid water to gaseous oxygen and hydrogen.

The nanoparticles 110 and portions of the microstructures 108 (e.g., exposed structural defects of the microstructures 108) can provide a surface to act as a nucleation site for vapor bubbles 106 to form. The vapor bubble 106 can grow in size (e.g., volume) until one or more of buoyancy of the bubble 106, flow of the liquid 104 in which the bubble 106 resides, and turbulence of the environment in which the bubble 106 resides overcomes the adhesion forces between the bubble 106 and the nanoparticles 110, at which point the bubble 106 generally releases from the solid structure 102 and into the surrounding liquid 104. The orientation, size, and shaping of the solid structure 102 can affect the formation and release of the bubble 106. In implementations, the angles of respective microstructures 108 can influence the size of the bubble 106, the angle or direction of release of the bubble, and so forth. For example, the solid structure 102 can define a depression or valley 114 positioned between adjacent microstructures 108, where one or more characteristics of the bubble 106 (e.g., size, shape, and so forth) formed in the valley 114 are physically defined by the valley characteristics. In implementations, the microstructures 108 protruding from the solid structure 102 include a vertical height of between 5 microns and 50 microns to form the valleys 114. A cross section of the valley 114 can be formed between the edges of adjacent microstructures 108 (with corresponding nanoparticle 110 layers). For example, in the implementation shown in FIG. 1A, the valley 114 is defined by a trailing edge 116 of the microstructure 108A and associated layer of nanoparticles 110 and by a leading edge 118 of the microstructure 108B and associated layer of nanoparticles 110.

When the bubble 106 forms on the surface of the solid structure 102 in the valley 114, an orientation of the microstructures 108 can influence the directionality of release of the bubble 106. The orientation of the microstructures 108 may be dependent on the orientation of the edges (e.g., trailing edge 116, leading edge 118) that define the valley 114. As shown in FIGS. 1A and 1B, the trailing edge 116 of the microstructure 108A is oriented at an angle $\alpha_1$ with respect to an orientation normal to the horizontal plane (I), whereas the leading edge 118 of the microstructure 108B is oriented at an angle $\alpha_2$ with respect to an orientation normal to the horizontal plane (I). In implementations, the microstructures 108 are angled between zero degrees and 85 degrees from normal relative to the horizontal plane (I) to a peak position 120 at the top of the microstructure (the angle of microstructure 108B is shown as $\alpha_m$ in FIG. 1A), or in specific implementations, between zero degrees and seventy degrees from normal. The orientation of the microstructures 108 and the precision thereof can vary depending on the material type of the solid structure 102, limitations associated with fabrication techniques used to produce the solid structure 102, and so forth, and can therefor reasonably vary outside the aforementioned range of zero degrees and seventy degrees from normal relative to the horizontal plane (I).

The allowable physical size of the bubble 106 formed within the valley 114 is generally limited by the spacing between adjacent microstructures 108. For example, for the solid structure 102 shown in FIGS. 1A and 1B, the bubble 106 includes a diameter ($d_b$) whose size is determined by the spacing between the nanoparticle layers 110 positioned on the trailing edge 116 of the microstructure 108A and on the leading edge 118 of the microstructure 108B. As the bubble 106 grows larger, such as having a diameter exceeding $d_b$, the bubble 106 is forced from the valley 114, which reduces contact with the solid structure 102 (e.g., with the surface of the nanoparticles 110) and thus reduces the adhesion force between the bubble 106 and the solid structure 102. The physical limitations attributed to the bubble 106 by the solid structure 102 are generally due to surface geometry of the solid structure 102, as opposed to wettability considerations of a surface measured by bulk contact angle. For a description on the separate impacts of wettability and physical surface shaping, see, e.g., Kruse et al., ibid, which is incorporated herein by reference. In implementations, the spacing between adjacent microstructures 108 can influence an efficiency of a heat transfer process (e.g., an electrolytic process, a nucleate boiling process, a condensation process, and so forth) in which the solid structure 102 is utilized, aspects of which are provided in Example 1 in detail below. In implementations, the layer of nanoparticles 110 wicks the liquid 104 into the valley 114 to increase efficiency of heat transfer, such as between the solid surface 102, the liquid 104, and/or the vapor 106.

Example Methods

Figure 4:
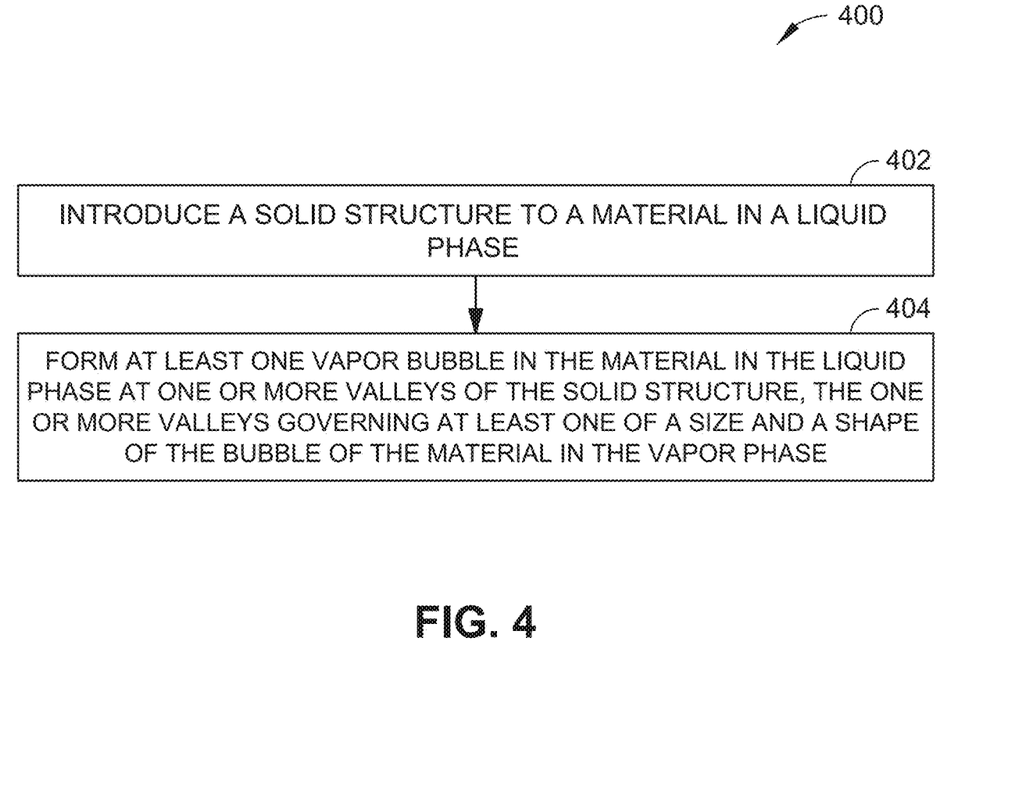
FIG. 4 is a flow diagram of a method for controlling change of phase of a material in accordance with an example implementation of the present disclosure.

Referring to FIG. 4, a flow diagram of a method 400 for controlling change of phase of a material is shown. Method 400 includes introducing a solid structure to a material in a liquid phase in block 402. In implementations, the solid structure includes a plurality of microstructures protruding at one or more angles relative to a horizontal plane; and at least one layer of nanoparticles positioned on the plurality of microstructures, the at least one layer of nanoparticles having a composition that is at least one of a same material as the plurality of microstructures and an oxide of the same material as the plurality of microstructures, the plurality of microstructures defining one or more valleys, each of the one or more valleys positioned between the at least one layer of nanoparticles of adjacent microstructures of the plurality of microstructures. For example, the solid structure can be the solid structure 102 described herein. The method 400 also includes forming at least one vapor bubble in the material in the liquid phase at one or more valleys of the solid structure, the one or more valleys governing at least one of a size and a shape of the bubble of the material in the vapor phase in block 404. For example, the solid structure 102 can form a vapor bubble 106 in the liquid 104 at the valley 114, the surfaces of which (e.g., the nanoparticles 110 forming the valley 114) provide a nucleation site for the bubble 106 to grow, where the geometrical features of the valley 114 influence the size of the bubble 106 (e.g., maximum size before the bubble 106 is physically displaced from the valley 114) and/or shape of the bubble 106 (e.g., during growth of the bubble 106 in the valley 114).

EXAMPLE IMPLEMENTATIONS

Example 1

This example implementation involves the application of multiscale metallic surfaces to the generation of hydrogen gas via electrolysis in an alkaline cell. The solid structure 102 includes multiscale structures with micro- and nanoscale features on electrode surfaces as an alternative approach to bubble mitigation and thus the enhancement of the change of phase efficiency. The separation distance between surface micro-scale structures on the electrolysis efficiency can be a factor in the change of phase efficiency, as described below.

In an electrolytic process, water is split into hydrogen and oxygen gas in an electrolysis cell by driving a current between two electrodes immersed in an aqueous solution. The amount of hydrogen and oxygen gas generated is directly dependent on the current; for every four electrons passed through the cell, one $O_2$ molecule is formed at the anode and two $H_2$ molecules are formed at the cathode. The voltage required to pass a given current through the cell determines the efficiency of the cell, with the cell efficiency being inversely proportional to the voltage.

The interfacial energy transfer between a solid and an adjacent liquid is governed in part by the ability of a surface to facilitate the change of phase (sometimes referred to as a "phase transition" or "phase conversion") of the liquid to a gaseous state in the vicinity of the interface. This change of phase generally occurs at specific nucleation sites where bubbles grow and are eventually released when buoyancy, flow, or turbulence overcomes the adhesion between the bubble and the surface. However, there exists a natural inefficiency in the process: the generation and growth of a gas bubble at a nucleation site covers a portion of the surface, which reduces contact with the solid surface and decreases the efficiency of the electrochemical reaction or a thermally induced phase change. It can be desirable to simultaneously reduce the diameter of bubbles released from the surface and increase the release rate in an attempt to increase the efficiency (or reduce the inefficiency) associated with the bubble covering a portion of the solid surface.

Figure 2A:
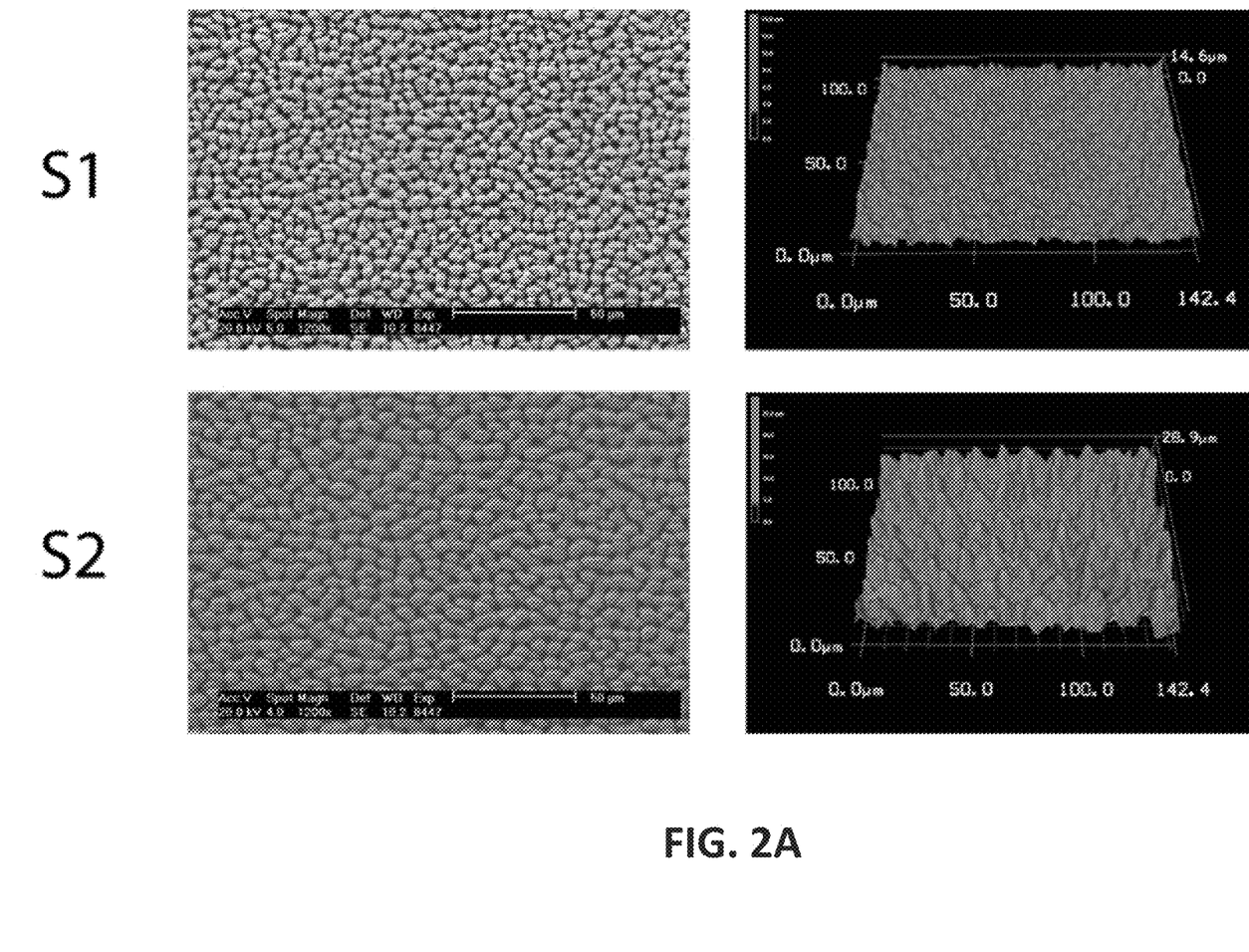
FIG. 2A is a scanning electron microscope (SEM) image and a 3D surface profile for two embodiments of shaped physical surfaces in accordance with example implementations of the present disclosure.
Figure 2B:
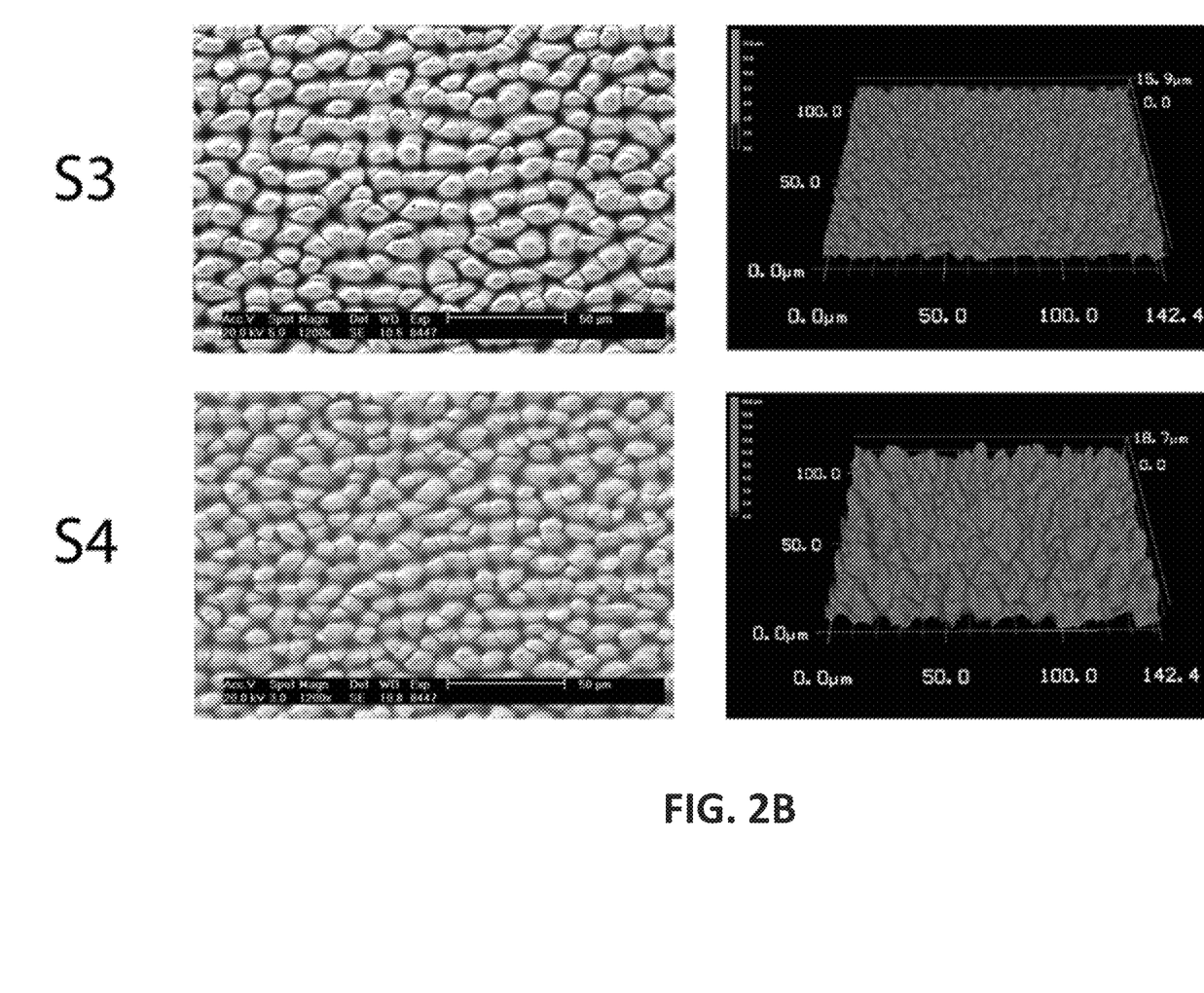
FIG. 2B is a scanning electron microscope (SEM) image and a 3D surface profile for two embodiments of shaped physical surfaces in accordance with example implementations of the present disclosure.
Figure 2C:
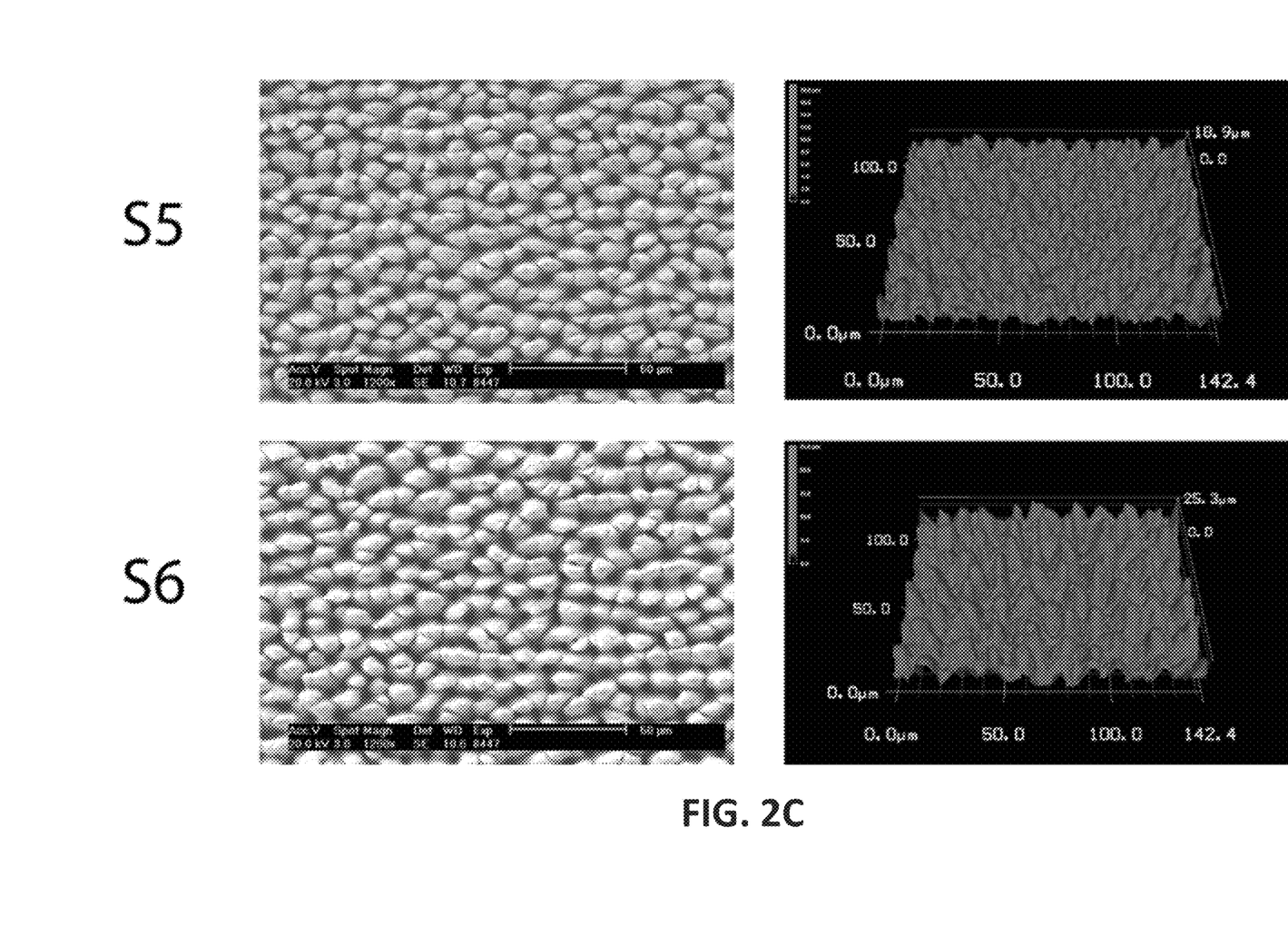
FIG. 2C is a scanning electron microscope (SEM) image and a 3D surface profile for two embodiments of shaped physical surfaces in accordance with example implementations of the present disclosure.

Femtosecond laser surface processing (FLSP) is used to physically shape the surface profile of the electrode surfaces in order to provide enhanced performance. The laser used was a Ti:Sapphire laser (Spitfire, Spectra Physics) capable of producing 1 mJ, 50 fs pulses with a center wavelength of 800 nm at a repetition rate of 1 kHz. Laser characteristics such as the pulse length and chirp were monitored and optimized using a Frequency Resolved Optical Gating (FROG) instrument from Positive Light (Model 8-02). The impact of the surface morphology on the electrolysis efficiency was studied with a series of seven distinct surfaces: six laser-processed surfaces (labeled S1-S6) and one unprocessed surface as a control. To generate laser-processed surface features, a target electrode was placed on a 3D computer-controlled translation stage and translated through a laser beam with a square flat-top profile with 150 μm sides. The flat top-profile was generated with a refractive beam shaper (GTH-4-2.2FA, Eksma Optics) in order to provide uniform laser fluence on the sample during processing. The laser fluence was varied from 1-2.9 J/cm2 and the number of pulses per laser spot was held constant at 400 for all samples. Laser illumination was performed in ambient atmosphere. The resulting electrode surfaces are characterized by multiscale self-organized features on the order of 5-50 microns in height and width that are covered in a layer of nanoparticles that develop on the surface through a combination of growth mechanisms including preferential ablation, capillary flow of laser-induced melt layers, and redeposition of ablated surface features. In this range of laser parameters, the surfaces morphologies span from below surface growth mounds (BSG-mounds) to above surface growth mounds (ASG-mounds). (Other laser parameters can be utilized to provide NC-Pyramid surface morphologies, which can result from a fluence of 0.1 J/cm$^2$ with between 40,000 and 50,000 number of pulses per laser spot (see, e.g., Kruse, et al., ibid., incorporated herein by reference). Scanning electron microscope (SEM) images of the electrode surfaces as well as 3D surface profiles measured with a Keyence VK-X100 laser confocal scanning microscope for each of samples S1-S6 are shown in FIGS. 2A-2C. The Keyence system has an axial resolution of 0.5 nm and a transverse resolution of 120 nm. The associated fabrication parameters and relevant surface characteristics for these surfaces are given in Table 1.

TABLE 1

Laser processing conditions and surface properties of stainless steel 316 electrode surfaces.

| | Design Parameters | Measured Parameters | | | |
|---|---|---|---|---|---|
| Sample Name | Laser Fluence [J/cm2] | Average Height [μm] | Surface Area Ratio | Surface Roughness [μm Rrms] | Structure Separation [μm] |
| S1 | 1.0 | 12.4 | 4.2 | 1.5 | 6.1 |
| S2 | 1.33 | 13.8 | 4.9 | 1.6 | 7.0 |
| S3 | 2.0 | 8.3 | 4.2 | 3.8 | 12.2 |
| S4 | 2.3 | 13.1 | 4.2 | 3.9 | 9.8 |
| S5 | 2.5 | 10.3 | 4.8 | 3.0 | 12.3 |
| S6 | 2.9 | 13.5 | 4.5 | 5.0 | 13.4 |

The average structure height, surface area ratio and surface roughness were determined by analysis of the 3D surface profile. The surface area ratio, commonly called the roughness factor, is the ratio of the total surface area to the geometric area. Due to the resolution limits of the Keyence system, the surface area ratio and the roughness factor do not consider any nanoparticles on the surface. Because the micro-scale structures are self-organized and are not uniformly spaced, the separation distance between surface structures was statistically calculated using a 2D Frequency Fourier Transform (FFT) analysis of the SEM images. The 2D FFT of plate 1 is characterized by a broad ring of spatial frequencies. The average structure spacing was calculated by averaging 50 angular slices of the 2D FFT and taking the peak value. The contact angle of a 1 μL water droplet on the sample was measured to be less than 5° for all laser-processed samples, indicating superhydrophilicity. This is advantageous in electrolysis as it enhances the contact between the electrode and the electrolyte. Furthermore, since all surfaces are superhydrophilic with indistinguishable contact angles, any variations of the performance of the electrodes can be attributed to differences in the geometric surface profile.

The electrochemical efficiency of each electrode surface during water splitting was characterized by measuring the current-voltage characteristics during the hydrogen evolution reaction (HER) in a 1 M potassium hydroxide (KOH) solution. The testing was performed using a custom-built acrylic 3-electrode electrolysis cell. In this configuration, the voltage is applied between the working electrode (the electrode under observation) and a reference electrode. This voltage then drives an electrochemical reaction in which the current is supplied by the counter electrode. In the present study, the reference electrode was CH Instruments Model 152 Hg/HgO electrode (E°=0.85 V at 25° C.). The counter electrode was 316 stainless measuring 2 inches by 4.4 inches and was processed with an area of 2 inches by 4 inches in order to ensure a sufficiently large enough surface area to not restrict current flow in the cell. The working (sample) electrodes were 1 inch by 2.5 inches in size, with a processed area of 1 inch by 2 inches. The use of the custom cell ensured that the relative positions between the 3 electrodes remained fixed for all experiments.

Figure 3A:
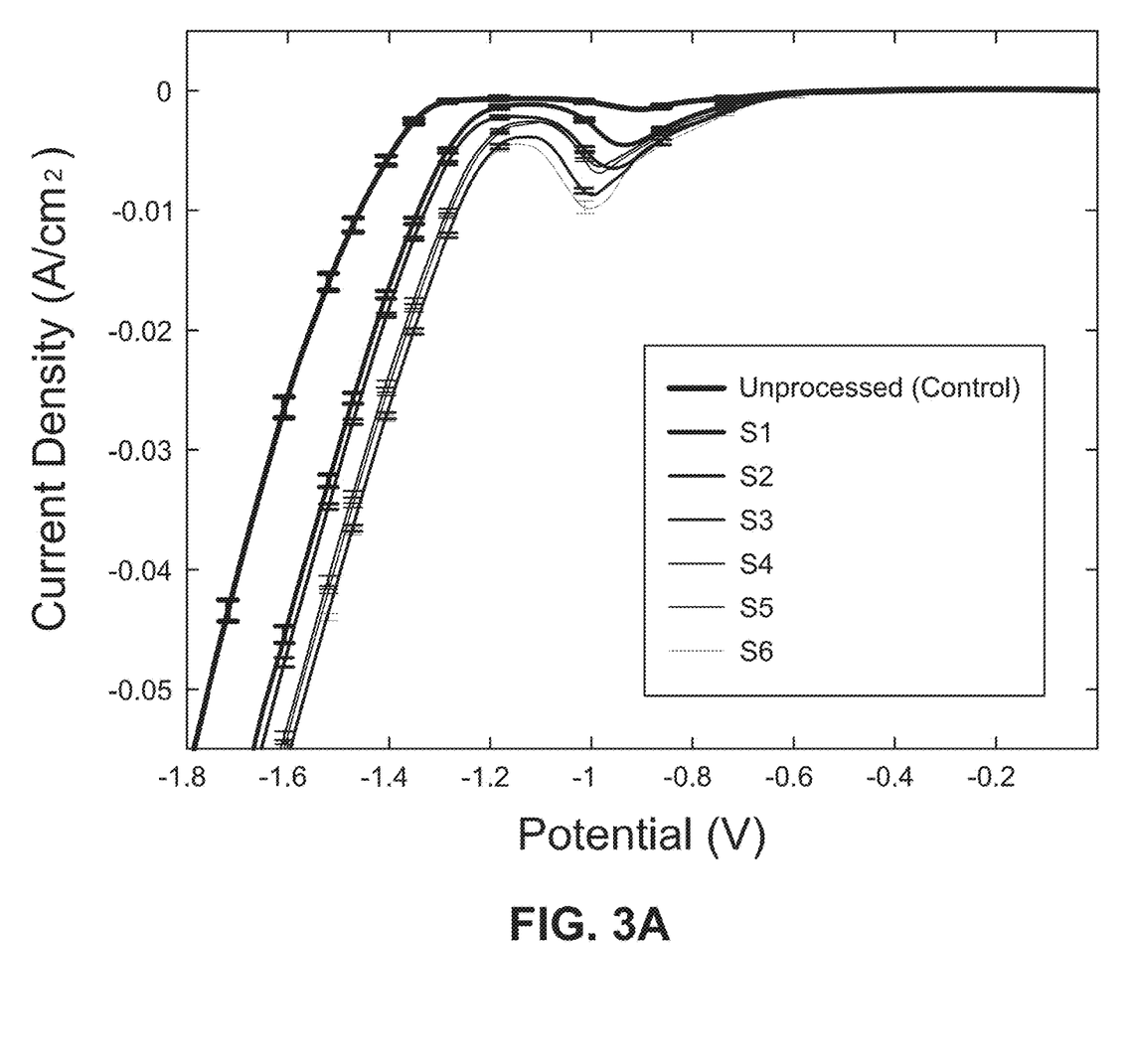
FIG. 3A is a diagram of current density versus potential for the embodiments associated with FIGS. 2A-2C and a control electrode.
Figure 3B:
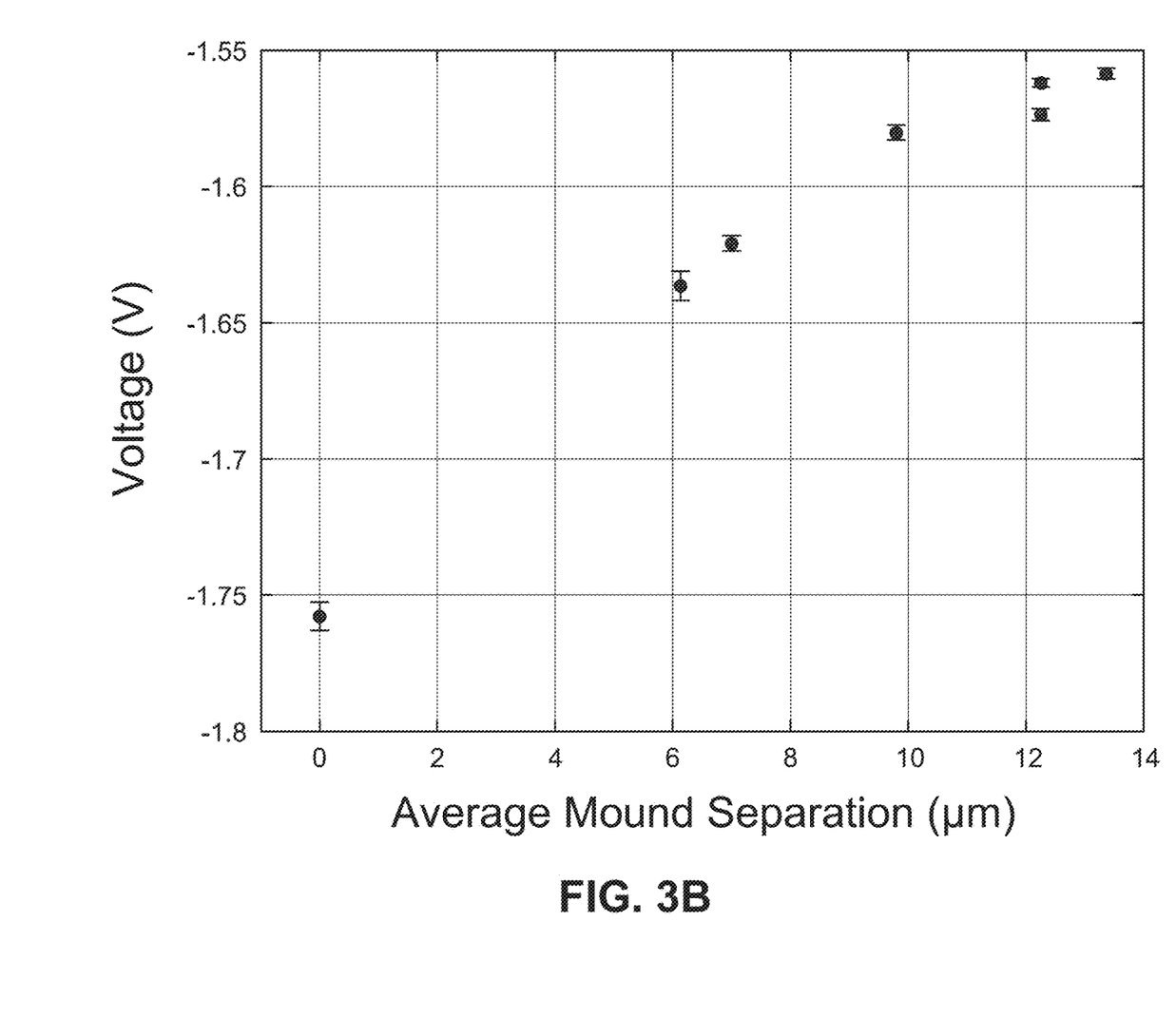
FIG. 3B is a diagram of voltage versus average mound separation for the embodiments associated with FIGS. 2A-2C and a control electrode.

The electrochemical characteristics of the electrode surfaces are shown in FIG. 3A. The primary water-splitting reaction occurs for voltages below 1.2 V and is characterized by a linear Ohmic relationship. The slope of the current-voltage relationship is constant for all electrodes tested, which indicates that losses associated with the cell construction and the electrolyte were constant for all tests and therefore variations in performance can be attributed to differences between the electrodes under observation. The role of the microstructure separation can be most clearly seen by measuring the electrode potential as a function of microstructure separation for a constant current density of 0.05 A/cm2. At a constant current density, the rate of the electrochemical reaction and thus the quantity of hydrogen gas being evolved at the electrode surface is held constant. The voltage required to generate this current is then a direct measure of the electrode efficiency, with electrode efficiency being the highest for the electrode with the least negative voltage. This analysis is shown in FIG. 3B and was generated using the surface properties listed in Table 1. The unprocessed electrode is plotted as having a mound separation of 0 as a reference for the performance of the laser-processed electrodes.

FIG. 3B demonstrates that the efficiency of the electrodes increases nearly linearly with the average mound spacing over the range of separations tested. For the largest structure spacing tested, 13.4 microns, the overvoltage was reduced by 200 mV as compared to the control electrode. Because the contact angle and the surface area of the electrodes are roughly constant for all of the laser-processed electrodes under observation, it is expected that the mechanism for the enhancement is related to the growth and release of bubbles on the electrode surface. Losses associated with the presence of gas bubbles can be attributed to two categories: the presence of bubbles in the electrolyte solution and the adhering of bubbles to the electrodes. In solution, bubbles increase the resistance and thus the cell loss. This loss can be minimized by careful design of the cell geometry, especially the separation distance between electrodes. This type of loss can be considered constant over the range of electrodes given the consistency of the current/voltage slopes (FIG. 3A). On the electrode surface, bubbles shield a portion of the electrode and reduce the effective surface area, leading to increased current densities. The production of gas on an electrode surface during an electrochemical reaction leads to a certain fraction of the electrode surface being covered by bubbles at any given time. This fraction (Θ) is referred to as the bubble coverage. The presence of bubbles may provide for a differentiation of the superficial current density (I/A) described by the total current (I) divided by the total electrode surface area (A), and the actual current density (j). The superficial and actual current densities are related by the equation:

$$j = \left(\frac{I}{A}\right) / (1-\theta) \quad (1)$$

Bubble coverage effectively decreases the active surface area and increases the actual current density associated with electrolysis in the remaining regions. The bubble coverage may depend on a variety of factors including the size of the bubbles released from the surface and bubble density:

$$\Theta = \left(\frac{\pi}{2}\right) * (z/A) * K_1^2 * R_r^2; \; K_1 = \begin{cases} 1 & \phi \leq 90° \\ \sin(\varphi) & \phi \geq 90° \end{cases} \quad (2)$$

where (z/A) is the number of bubbles per area (A), $K_1$ takes into account the contact angle (φ) (<900 for a hydrophilic surface), and $R_r$ is the radius of bubbles right before release from the surface.

For a structured surface of the types seen in FIGS. 2A-2C, the surface geometry is able to influence the bubble coverage and thus the electrode efficiency by reducing the $R_r$, the radius of the released bubbles. It is expected that nucleation occurs in the valleys between microstructures on a rough surface. On a flat surface or a surface with steep, narrow structure separation (e.g. samples S1 and S2), a bubble will expand and cover an increasing portion of the surface until buoyancy forces or turbulence overcomes the adhesion of the bubble to the surface. When the distance between microstructures reaches approaches the widths of the structures themselves, the availability for contact between the growing bubble and the surface decreases. Instead, the bubble is gradually pushed out of the valley during growth and is expelled when the bubble is only in contact with the peaks of the structures. This process by which the surface geometry can directly control Rr and by limiting surface contact is shown schematically in FIGS. 1A and 1B.

It is noted that this physical mechanism is due to surface geometry and is a separate phenomenon than the wettability of the surface as measured by the bulk contact angle (related to $K_1$ in equation (2). Thus, for a given surface area and contact angle, the efficiency of the hydrogen evolution reaction can be further tailored through the variation of the separation of the microscale structures as shown in FIG. 3B. Increasing the separation between microstructures reduces the contact between the vapor bubble and the electrode surface. This effect is further enhanced by the increased presence of circular pits with increasing mound separation as seen in the SEM images and 3D surface profiles in FIGS. 2A-2C.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A system for the control of change of phase of a material, comprising:
   a solid structure contacting each of a material in a liquid phase and a material in a vapor phase, the solid structure including:
   a plurality of microstructures protruding at one or more angles relative to a horizontal plane, wherein the one or more angles are between zero degrees and 85 degrees from normal relative to the horizontal plane, wherein the plurality of microstructures are formed from one or more of nickel, nickel alloy, gold, gold alloy, stainless steel alloy, titanium, titanium alloy, aluminum, aluminum alloy, copper, copper alloy, zirconium alloy, silicon carbide, Inconel alloy, silicon, silicon alloy, germanium, germanium alloy, and mixtures thereof; and
   at least one layer of nanoparticles positioned on the plurality of microstructures, wherein the plurality of microstructures and the at least one layer of nanoparticles provide a surface acting as a nucleation site for a bubble of the material in the vapor phase;
   the at least one layer of nanoparticles having a composition that is at least one of a same material as the plurality of microstructures and an oxide of the same material as the plurality of microstructures, such that the surface in contact with the bubble is at least one of a same material as the plurality of microstructures and an oxide of the same material as the plurality of microstructures; wherein
   the plurality of microstructures defines one or more valleys, each of the one or more valleys positioned between the at least one layer of nanoparticles of adjacent microstructures of the plurality of microstructures, the one or more valleys configured to govern at least one of a size and a shape of the bubble.

2. The system of claim 1, wherein the one or more angles of the plurality of microstructures define a directionality of release of the bubble of the material in the vapor phase from the solid structure.

3. The system of claim 1, wherein the one or more angles of the plurality of microstructures are between zero degrees and seventy degrees from normal relative to the horizontal plane.

4. The system of claim 1, wherein at least one microstructure of the plurality of microstructures is spaced between 5 microns and 15 microns from a respective other microstructure of the plurality of microstructures.

5. The system of claim 1, wherein each microstructure of the plurality of microstructures is spaced between 5 microns and 15 microns from a respective other microstructure of the plurality of microstructures.

6. The system of claim 1, wherein the plurality of microstructures includes an average height of between 5 microns and 50 microns.

7. The system of claim 1, wherein the one or more valleys are defined by the at least one layer of nanoparticles positioned on a trailing edge of a first microstructure of the plurality of microstructures and by the at least one layer of nanoparticles positioned on a leading edge of a second microstructure of the plurality of microstructures.

8. The system of claim 1, wherein the at least one layer of nanoparticles is configured to wick the material in the liquid phase into the one or more valleys.

9. The system of claim 1, wherein the plurality of microstructures further includes an atomic layer of material deposited by atomic layer deposition, and wherein the atomic layer material is a low surface energy material to increase contact between the nanoparticles.

10. A method for controlling change of phase of a material, comprising:
introducing a solid structure to a material in a liquid phase, the solid structure including:
a plurality of microstructures protruding at one or more angles relative to a horizontal plane, wherein the one or more angles are between zero degrees and 85 degrees from normal relative to the horizontal plane, wherein the plurality of microstructures are formed from one or more of nickel, nickel alloy, gold, gold alloy, stainless steel alloy, titanium, titanium alloy, aluminum, aluminum alloy, copper, copper alloy, zirconium alloy, silicon carbide, Inconel alloy, silicon, silicon alloy, germanium, germanium alloy, and mixtures thereof; and
at least one layer of nanoparticles positioned on the plurality of microstructures, wherein the plurality of microstructures and the at least one layer of nanoparticles provide a surface acting as a nucleation site for a bubble of the material in the vapor phase; the at least one layer of nanoparticles having a composition that is at least one of a same material as the plurality of microstructures and an oxide of the same material as the plurality of microstructures, such that the surface in contact with the bubble is at least one of a same material as the plurality of microstructures and an oxide of the same material as the plurality of microstructures, the plurality of microstructures defining one or more valleys, each of the one or more valleys positioned between the at least one layer of nanoparticles of adjacent microstructures of the plurality of microstructures; and
forming at least one vapor bubble in the material in the liquid phase at one or more valleys of the solid structure, the one or more valleys governing at least one of a size and a shape of the bubble of the material in the vapor phase.

11. The method of claim 10, further including:
releasing the at least one vapor bubble from the one or more valleys of the solid structure in a direction of the one or more angles relative to the horizontal plane.

12. The method of claim 11, wherein the one or more angles relative to the horizontal plane are between zero degrees and seventy degrees from normal relative to the horizontal plane.

13. The method of claim 10, wherein at least one microstructure of the plurality of microstructures is spaced between 5 microns and 15 microns from a respective other microstructure of the plurality of microstructures.

14. The method of claim 10, wherein the plurality of microstructures includes an average height of between 5 microns and 50 microns.

15. The method of claim 10, wherein forming the at least one vapor bubble in the material in the liquid phase at one or more valleys of the solid structure includes:
forming the at least one vapor bubble in the material in the liquid phase at one or more valleys of the solid structure until the at least one vapor bubble physically engages the at least one layer of nanoparticles of two adjacent microstructures.

16. The method of claim 15, wherein forming the at least one vapor bubble in the material in the liquid phase at one or more valleys of the solid structure until the at least one vapor bubble physically engages the at least one layer of nanoparticles of two adjacent microstructures includes:
forming the at least one vapor bubble in the material in the liquid phase at one or more valleys of the solid structure until the at least one vapor bubble physically engages the at least one layer of nanoparticles of two adjacent microstructures to physically displace the at least one vapor bubble from the one or more valleys.

17. The method of claim 10, wherein the one or more valleys are defined by the at least one layer of nanoparticles positioned on a trailing edge of a first microstructure of the plurality of microstructures and by the at least one layer of nanoparticles positioned on a leading edge of a second microstructure of the plurality of microstructures.

18. The method of claim 10, wherein introducing a solid structure to a material in a liquid phase further includes:
introducing the solid structure to the material in the liquid phase; and
wicking at least a portion of the material in the liquid phase into the one or more valleys via the at least one layer of nanoparticles.

19. An electrode system, including one or more electrodes, each of the one or more electrodes having a surface comprising:
a solid structure contacting each of a material in a liquid phase and a material in a vapor phase, the solid structure including:
a plurality of microstructures protruding at one or more angles relative to a horizontal plane, wherein the one or more angles are between zero degrees and 85 degrees from normal relative to the horizontal plane, wherein the plurality of microstructures are formed from one or more of nickel, nickel alloy, gold, gold alloy, stainless steel alloy, titanium, titanium alloy, aluminum, aluminum alloy, copper, copper alloy, zirconium alloy, silicon carbide, Inconel alloy, silicon, silicon alloy, germanium, germanium alloy, and mixtures thereof; and
at least one layer of nanoparticles positioned on the plurality of microstructures, wherein the plurality of microstructures and the at least one layer of nanoparticles provide a surface acting as a nucleation site for a bubble of the material in the vapor phase;
the at least one layer of nanoparticles having a composition that is at least one of a same material as the plurality of microstructures and an oxide of the same material as the plurality of microstructures, such that the surface in contact with the bubble is at least one of a same material as the plurality of microstructures and an oxide of the same material as the plurality of microstructures; wherein
the plurality of microstructures defines one or more valleys, each of the one or more valleys positioned between the at least one layer of nanoparticles of adjacent microstructures of the plurality of microstructures, the one or more valleys configured to govern at least one of a size and a shape of the bubble.

\* \* \* \* \*